US005735192A

United States Patent [19]

Paez

[11] Patent Number: 5,735,192

[45] Date of Patent: Apr. 7, 1998

[54] MACHINE FOR DISPENSING FRIED POTATOES

[75] Inventor: Javier Fernandez Paez, Madrid, Spain

[73] Assignee: Patatas Chef, S.L., Madrid, Spain

[21] Appl. No.: 737,303

[22] PCT Filed: Nov. 29, 1995

[86] PCT No.: PCT/ES95/00141

§ 371 Date: Oct. 23, 1996

§ 102(e) Date: Oct. 23, 1996

[87] PCT Pub. No.: WO96/26507

PCT Pub. Date: Aug. 29, 1996

[30] Foreign Application Priority Data

Feb. 23, 1995 [ES] Spain .................................... 9500355

[51] Int. Cl.[6] .............................. A47J 27/00; A47J 37/00; A47J 37/12; G01F 11/00

[52] U.S. Cl. ................................ 99/342; 99/330; 99/353; 99/357; 99/407

[58] Field of Search ............................. 99/330–336, 342, 99/352–356, 357, 427, 443 C, 443 R, 403–410; 426/231, 509, 523; 221/81, 82, 150 R, 150 A, 150 HC, 203; 366/231

[56] References Cited

U.S. PATENT DOCUMENTS

| | | | |
|---|---|---|---|
| 3,685,432 | 8/1972 | Hoeberigs | 99/357 |
| 4,438,683 | 3/1984 | Bartfield | 99/330 |
| 4,722,267 | 2/1988 | Galockin et al. | 99/407 X |
| 4,838,455 | 6/1989 | Hoeberigs | 221/150 A |
| 5,189,944 | 3/1993 | Rasmussen et al. | 99/334 |
| 5,224,415 | 7/1993 | McFadden et al. | 221/150 HC |
| 5,272,961 | 12/1993 | Campbell et al. | 99/353 |
| 5,367,949 | 11/1994 | Nitschke et al. | 99/334 |
| 5,404,796 | 4/1995 | Campbell et al. | 99/357 |
| 5,404,797 | 4/1995 | Millar | 221/150 R |
| 5,419,239 | 5/1995 | Covington et al. | 99/427 |
| 5,586,486 | 12/1996 | Nitschke et al. | 99/330 |
| 5,605,091 | 2/1997 | Garber | 99/330 |

FOREIGN PATENT DOCUMENTS

| | | |
|---|---|---|
| 0571361 | 11/1993 | European Pat. Off. . |
| 0608463 | 8/1994 | European Pat. Off. . |
| 0636334 | 2/1995 | European Pat. Off. . |
| 2597319 | 10/1987 | France . |
| 2254246 | 10/1992 | United Kingdom . |
| 9004346 | 5/1990 | WIPO . |
| 9428700 | 12/1994 | WIPO . |

*Primary Examiner*—Timothy F. Simone
*Attorney, Agent, or Firm*—Robert M. Schwartz, PA; Robert M. Schwartz

[57] ABSTRACT

The potato, peeled, cut and refrigerated, is supplied by means of an endless worm to a displaceable carriage arranged on and adjustable beam balance and is passed to a single or double dose frier, falls on a separate tray by means of a double endless worm with truncated extremities, further receives the selected sauce and the salt, which have been previously dosed by dosers, and passes to another delivery carriage.

15 Claims, 10 Drawing Sheets

MACHINE FOR DISPENSING FRIED POTATOES

BACKGROUND OF THE INVENTION

1. Field of the Invention

The invention object of this specification refers to an automatic French fries dispensing machine, that fries them cut in pieces rather than based on a previously formed mass, not ruling out other related applications such as to fry squid and fish pieces.

2. Description of Prior Art

It is fitted with a cold store with potato dosing equipment, being this equipment of the Roman balance type, frying device with filter and means to dispense containers, forks and bulk condiments from sauce and salt containers, machine in which, once the frying type and the condiments have been selected using the selector push buttons and the price of the desired portion or consecutive portions has been inserted in the cash collection slot, a frying procedure takes place at the completion of which an optical signalling device lights up and a sound emitting device goes off with the appropriate message and the various products are duly dispensed, an external access lid is lifted and the user—consumer, only has to remove the food tray and accompanying fork from the dispensing window or, consecutively, the various food trays requested.

BACKGROUND OF THE INVENTION

There are automatic machines, of the coin operated type, that fry potato pieces within them and then proceed to dispense them out, together with condiments selectively picked by the user, even if they are not widely used.

Normally these machines tend to operate using hot air, so that it would not be possible to refer to frying machines in the most strict sense. There are other machine types that do indeed fry the product, coinciding all of the above machines in that they share the same basic product, namely potato paste conveniently rehydrated and shaped in accordance with the size and taste predominant in the various countries in which they are used.

The applicant is not aware of any French fries dispensing machine, of the automatic coin operated type, that would actually fry previously peeled and cut up potatoes.

The frying machine is normally fitted with a radially turning blade distant from the resistance placed forming a dihedral angle and at the diagonal corner opposite to where the potato dosage feeding point is located, normally having a minimal water level, which is required to absorb the residual products of prior frying operations and to prevent any contamination to the flavour of the dispensed product.

The blade turning speed is regulated so that the selected cooking time matches a full blade rotation turn, so that at the end of its turn it will emerge under the fries, collect them, pull them out of the frying oil and lift them until the blade reaches its vertical position, when the force of gravity causes the fries to fall into the outlet hopper, centrally arranged in respect of the frier and with its slope slantingly arranged towards the outside.

Despite the fact that the cooking time is short, normally some forty to sixty seconds, depending upon the machine, it would nevertheless be appropriate to fit them with selective dispensing means, whether through the repetition of a second cycle overlapping the first one, through the simple introduction of twice as much money into the cash collection device or through a double serve, caused by the selection of two serves at the selector located at the front of the machine.

Notwithstanding the fact that this is a problem easily solved using conventional mechanical and electronic means, no other machine is known that would allow the user to purchase food for a companion without having to duplicate the handling and automatism operation cycles.

On the other hand, tray dispensing, from their piled up storage, tends to suffer from the sporadic but bothersome inconvenient of letting them drop slanted, so that the potato pieces fall out of their container and spread around the collection window, which is also the case with the sauce and salt containers, also normally dispensed by these machines, causing further inconvenience to users.

The reason for this is that the very light weight to these trays, naturally empty, requires a very precise tray release mechanism for them to fall totally flat, which further needs a very fine adjustment, not only of the space separating the piled up trays, but also of the exact times when their corners are released, degree of precision which, because of the high cost, is not incorporated into the models currently in the market.

Finally, the smoke filter normally fitted has a single component and also both the sauces and the salt tend to be dispensed out inside containers, so that it is totally unavoidable to generate a residue, the container itself, which would be easy to do without by using a proper dosing dispensing mechanism which, on the other hand, would help lower product dispensing costs, because of the container cost saving, plus a reduction in respect of maintenance costs and of possible errors during the supply of these containers.

SUMMARY OF THE INVENTION

The solution hereby advanced consists of a French fries dispensing machine, of the type that is automatically operated and that dispenses French fries with various degrees of cooking, depending on the taste of the user—consumer, and that also dispenses various sauces, salt and relevant accessory means required for their consumption.

This machine incorporates a number of improvements herein detailed, among which it would be worth emphasizing the cold store, conventional in respect of the compressor, evaporator and periodic thawing means, which keeps previously cut up potatoes at a temperature of −18° C. and which incorporates a potato doser, consisting of a motor driven sliding container trolley capable of adopting three positions, load, wait and unload, arranged upon dosing scales, fed from a hopper fitted with a worm drive that receives the product from the refrigerator upper cabinet and which destination is the upper inlet opening of the frier; it does also incorporate closing means and, simultaneously, heat insulation means, using springs, connecting the container trolley to the refrigerator—frier assembly.

The frier rotates half a turn or a full turn per serve, using a motor driven drag and elevation radial blade, up to a central hopper with an outwards slanted slope. Finally, the tray doser is arranged using a single motor arrangement, of the overhead mounted type, with double pinion—chain traction and with a tray separation gap related to the pitch thread of two oppositely arranged worm screws.

Once the coin has been introduced and the relevant frying type and condiments are selected, the frying process takes place and, once finished, an optical indicator lights up followed by a second sound indicator incorporating an appropriate message, the various products are duly dispensed, an external trap door opens and the only left to do to the user—consumer is to remove the food tray and fork from the appropriate receptacle or compartment, for which a maximum period of 20 seconds is allowed, after which the tray is pushed by the trolley and dragged into a trash container, so as to leave the machine ready to be used once again.

Should the consumer remove the tray from the dispensing receptacle within the previously mentioned 20 second time period, this removal is duly detected by a photoelectric cell that puts the machine in the situation of restarting a new cycle, without having to wait until the end of the whole 20 second maximum wait period.

As is normal in this type of machines, it is internally fitted with an upwardly arranged hopper which purpose is to receive from the maintenance employee the previously peeled potato pieces already cut up and with their maximum length duly selected, converting this hopper into the feeding container, located between an upper storage tank and the cut up potato dosing scales.

The upper storage tank, intermediately placed in the feeding process, in order to maintain the product duly frozen, is directly linked to the hopper, resting upon simple guides that make it easy to pull out the drawer to refill it, once the hopper has been manually fed with potato pieces, being the assembly incorporated inside the freezer cabinet and being accessible through the frontal door of the latter.

At the lower area of the hopper is located the doser feeder, arranged in the shape of an endless worm screw actuated by a motor driven gear box, which worm screw regulates the passage of the product and being this hopper downwardly fitted with a closure mechanism, heat insulating, not shown in the drawings, of conventional arrangement and actuated by springs that circumstantially separate the inside of the hopper from access to the frier, when open.

These potato pieces fall upon a platform located below the hopper, arranged as a Roman scales weighing plate, in the form of a balanced mechanism characterized by a counterweight system with the equivalent in weight of the product to be dispensed, which may be varied by the operator.

Upon this weighing plate moves, through the action of another motor driven gear box, a "U" shaped container trolley open at its upper and lower sides, which wings are fitted at their ends with two external ribs or projections that enter in contact with the respective projections of three consecutively aligned microswitches.

Intermediate located upon the length of the wings of the "U" is arranged a side partition that closes the container trolley laterally, so that it has sufficient capacity to upwardly receive the load of cut up potato pieces, the first of which rest upon the bottom plate.

The motor driven gearbox that displaces the potato chips dosage container trolley slides it, by pulling a chain attached to the trolley, along a line of microswitches, using a "U" shaped profile with projecting wings as a guide, from a final external top, transversally placed in respect of the weighing plate and located at its side edge, at the contact position of the microswitch further back coinciding with the weighing position to another, forwardly opposite and located near the axis of this motor driven gearbox, in coincidence with the unloading position.

The trolley, once loaded, pushes the frier feeding gate towards the front in the direction of the most advanced microswitch and framed by common guides, leaving free an opening practised in this guiding "U", permitting the free access of the potatoes to the frier and then moving the trolley to a position which is intermediate in respect of this advancement, which is that of stoppage and readiness for a new serve, and recovering the frier lid, made of metal covered by heat insulation, to its initial position of closure and separation of the frier body from the access to the hopper discharge outlet, further downwardly isolating the cooling section from the frying area.

The balancing mechanism of this weighing scale is arranged using the rod of a coil, placed so that it is capable of vertical movement and also of moving to the end of a freely turning arm, located under the central position of the dosage container trolley, being the other end of the arm fitted with a regulating screw that, downwardly supported near the right side end of the weighing plate, balances its height in respect of the rest of the dosing platform whenever the coil is actuated, which attracts its rod that had been displaced up to its upper end position by the weight of the product dosage, thus levelling the weighing plate in respect of the container trolley displacement platform.

At the same time, the weighing plate is further downwardly fitted with balancing means, by way of a counterweight located near the other opposite end and consisting of a side axis and a pointer or part projecting from that same side which, when the container receives the potato pieces and the previously mentioned counterweight is displaced by their weight, causing the weighing plate to tilt downwardly by its first side, this causes the opposite side to move upwards, also lifting the projecting pointer that is upwardly fitted with a microswitch that tops against the internal side of an extension of the container side displacement stop, causing the counterweight to act as a new lower regulation screw, centrally located in respect to the lower surface of the weighing plate, which causes the weighing scales to remain perfectly flat, thus guaranteeing the exact amount of potatoes to be included into each portion or serve.

Once this load microswitch is triggered, the rod of the coil acts against the weighing scales and the action of the worm screw ends, so that no further potato pieces are deposited into the container and causing it to move forward up to its other discharge end position and to discharge its load by gravity, displacing the upper lid and feeding this portion of potato pieces into the frier.

This load plate balancing arrangement, although more complex than other conventional arrangements, due to the incorporation of a fine levelling device conformed by the locking coil and weighing plate approximation and regulation screw, has the advantage of offering a better balancing and, above all, prevents the insertion of potato ends between the weighing plate and the container trolley sliding film.

Between the frier and the cold store located above it, and also upon the remaining walls of this cold store, there is enough room left to incorporate a heat insulating film, in horizontal arrangement and leaving free only a side opening at its left end, corresponding to the right most advanced position, of the displacement of the container trolley located above it, opening upon which is arranged the access gate, also forming a metal sandwich that incorporates the appropriate heat insulation.

The frier is fitted with guides, similar to those of the main potato pieces storage tank, for the frontal manual displacement of the frier, both for periodic replacement of full loads and topping up the frying oil used up.

Following the time period required for the appropriate start up process, the oil keeps its temperature stable, slightly high within minimum temperature margins, being fitted with a thermostat that actuates upon the contactor of the electric element of the frier, in which the potato cooking temperature decreases slightly due to the effect of the mass of product and its cold storage temperature.

The frier is built rotative and distanced, fitted with two radial blades, instead of the single blade normally used in conventional machines, regulated so that the cooking time selected matches a full rotation of one of the blades, so that at the end of its travel both blades emerge consecutively under the potato pieces, pick them up and drain the oil from the fries and lift them up, until they drop by gravity when the blade reaches its upper vertical position, falling into the outlet hopper, centrally arranged in respect of the frier and with its slope slanted outwards, and with a time margin, between one serve and the following one, greater than 20 seconds, period of time that is sufficient to act upon the tray pulling trolley and to prevent an accumulation of containers at the end of the process, at the dispensing outlet. In the case of a single serve having been requested, this serve is then collected by the first blade and the second one simply rotates empty, that is to say, does not collect any load.

The potato pieces then drop directly from the hopper upon a tray, previously placed at the dispensing recipient, as later described.

Besides the initial metal filter, the filter is double, being the device serially fitted with one matt type, prismatic and rectangular filter, easily removable and washable together with the frier, whenever the frying oil is recycled, and another consecutively placed one, of the active coal type, shaped as a double parallel cylinder, longer lasting due to the prior protection of the first filtering unit.

Regarding the tray dispensing mechanism, it is arranged vertically, being the trays centrally piled up and consecutively hanging from the thread pitch of the worm screw located upon each of two axis arranged sideways in respect of the trays and which are driven by a single motor arranged as an extension of one of them and incorporating pull drive to the opposite one by way of a pinion—chain arrangement. For the purposes of carefully separating one tray from those upwardly piled up the worm screw features an upper tapered finish that enables a gradual play of the thread pitch.

The other end, also tapered, of the worm screw and previously described double hanging arrangement from the respective pitch threads, enables a perfectly horizontal drop caused by the synchronous rotation of both axes and by the precise discontinuance of the support of the end of the thread at the lower taper of the worm screw, further doing away with the need of another driving element.

Regarding the fork dispensing device, this is arranged with the same vertical piled-up storage arrangement and incorporates a coil that acts upon an internal axial rod that moves forward transmitting the movement to the arm of a flat bar that rotates in respect of a fixed point and which other arm is linked to a plate that receives this articulated impulse of the rod through the axis of the flat bar, with enough play at the connections at its ends to allow the linear advance and separation of the plate holding the forks, so that each impulse of the coil is corresponded with a swinging movement and, with it, the delivery of a fork.

As regards the sauce dispenser, it is not an individual serve dispensing mechanism, but a real product dosing device which, whenever the motor, which is located downwardly in respect of the dispenser, turns over, it does then allow a piston rod—cranked handle mechanism linked to its axis to generate an alternating movement in the piston that causes a vacuums at an upper tank, shaped as a conventional bottle placed in the inverted position, from which it extracts the sauce, pushing it out of a pipe located at the lower axial projection of the tank opening, located upwardly near the external tray dispensing recipient, being further fitted with a ball placed at the end of the outlet to prevent the retreat of the sauce to the storage tank, further keeping the sauce outlet closed during inactivity or rest periods, through the action of a spring.

The salt dispenser is made up of a coil which rod is linked to another piston rod—cranked handle mechanism that induces an oscillating or swinging movement to the salt shaker, which causes salt to drop upon the tray containing the serve of French fries.

Finally, the tray displacement trolley, featuring a number of positions similar in number to those of the frier supply trolley, although arranged in consecutive positions located from right to left in the figure, namely those corresponding to the positions of rest, French fries drop and collection by the customer at the delivery pit fitted with an external gate, fitted with actuating and transmission means identical to those of the tray frier supply trolley (motor and pinion—chain), as well as with similar actuation means (cam upon three microswitches), although different in respect of its guiding means, consisting of a collar that slides upon a calibrated shaft. The rest position is used to cause the trolley to tilt by gravity if still occupied by the French fries tray, dropping them into a container located below.

This operation is automatically performed if the tray is not duly withdrawn within a time period of 20 seconds, interlocked through the operation of a photoelectric cell that detects the collection of the tray, so that the process may start all over again.

BRIEF DESCRIPTION OF THE DRAWINGS

In order to complement the description made herein, and so as to aid the better understanding of the features of the invention, this patent specification includes, as an integral part thereof, a set of drawings where the following has been duly represented with a merely illustrative but not limitative character.

DESCRIPTION OF THE PREFERRED EMBODIMENTS

Figure 1:
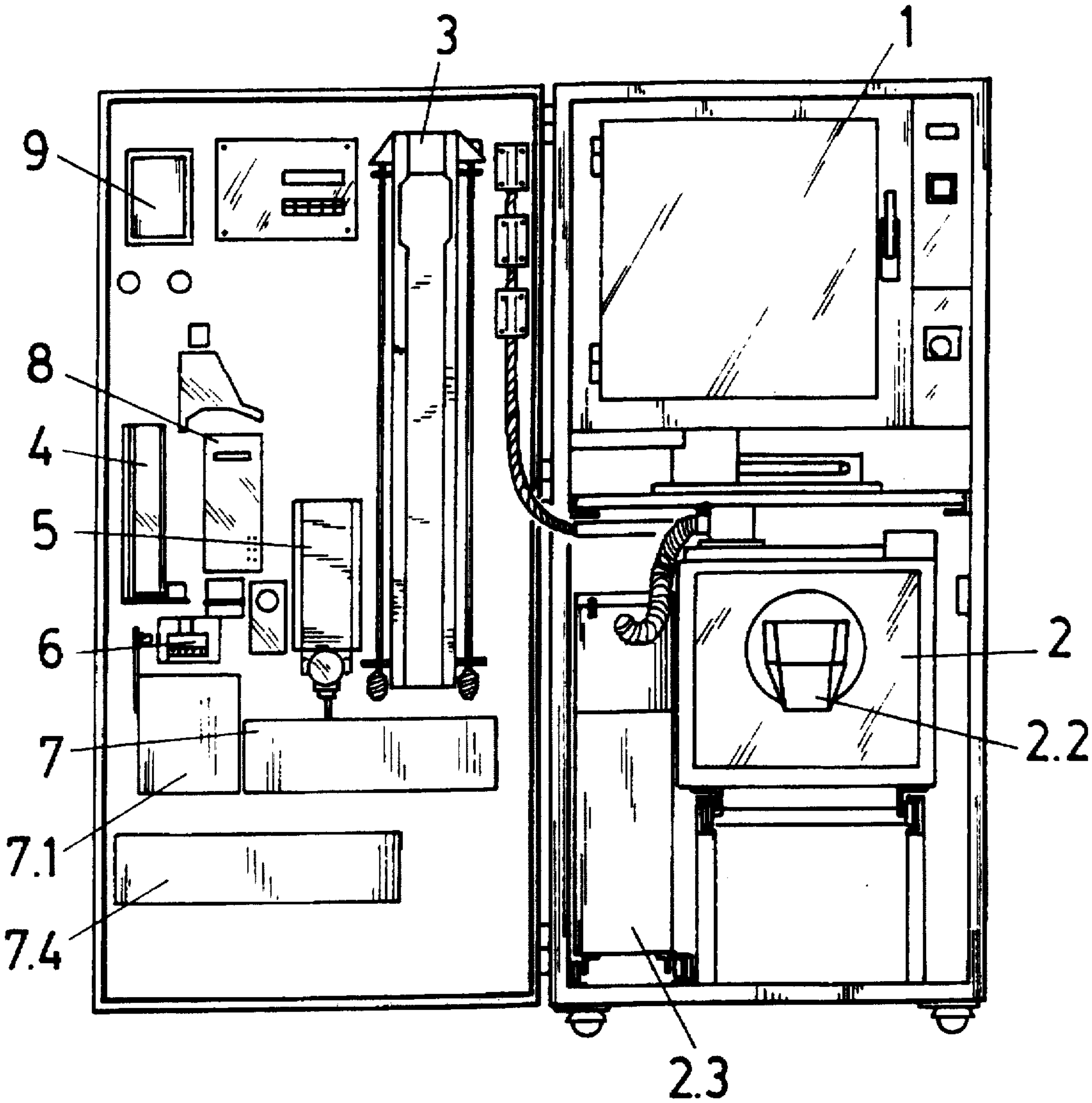
FIG. 1 is a frontal view of both internal surfaces of the French fries dispensing machine in the open position.
Figure 2:
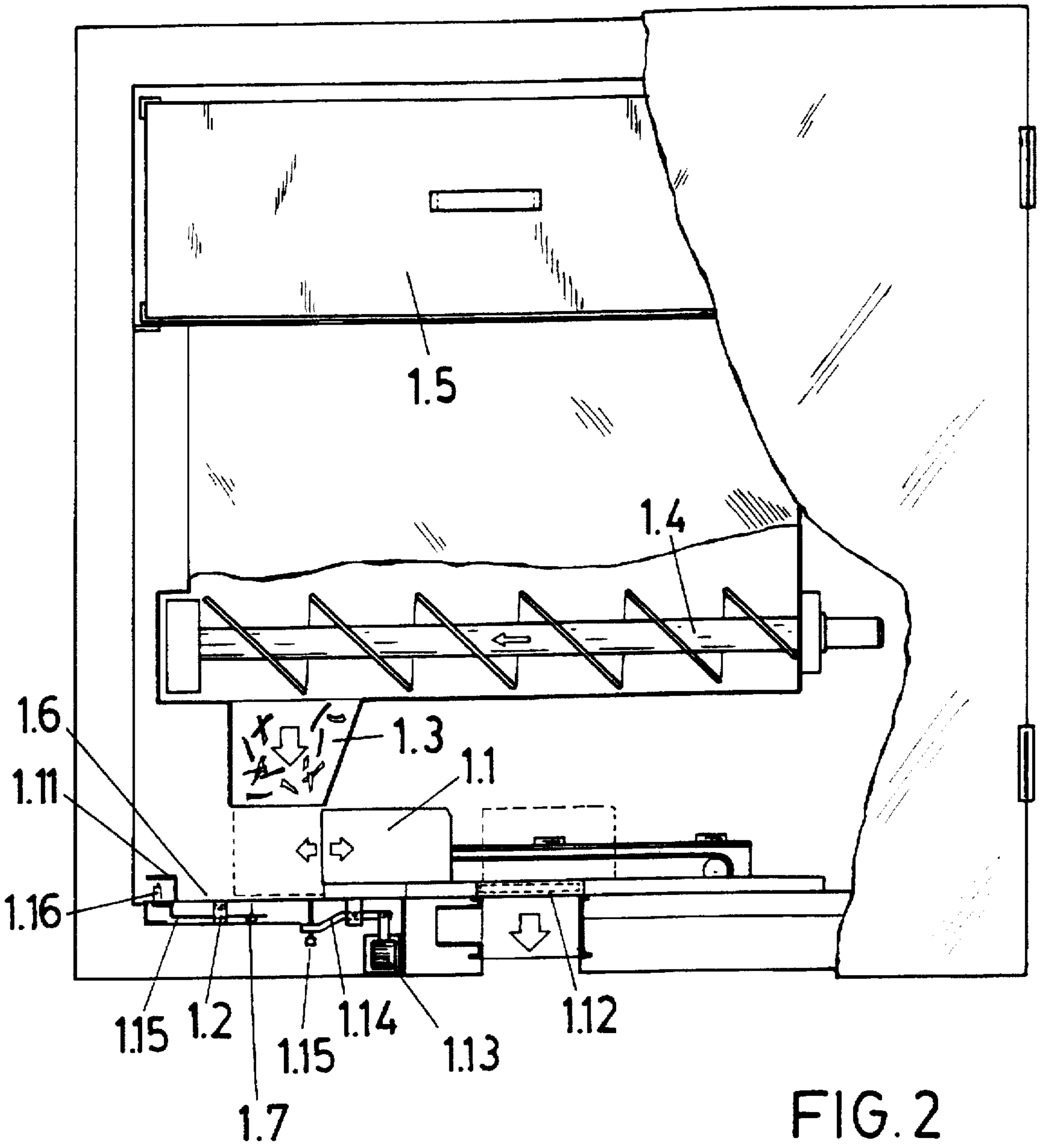
FIG. 2 is a frontal view of the potato chips dosing assembly cold store, featuring a partial cut out, illustrating the enhancements object of this invention.
Figure 3:
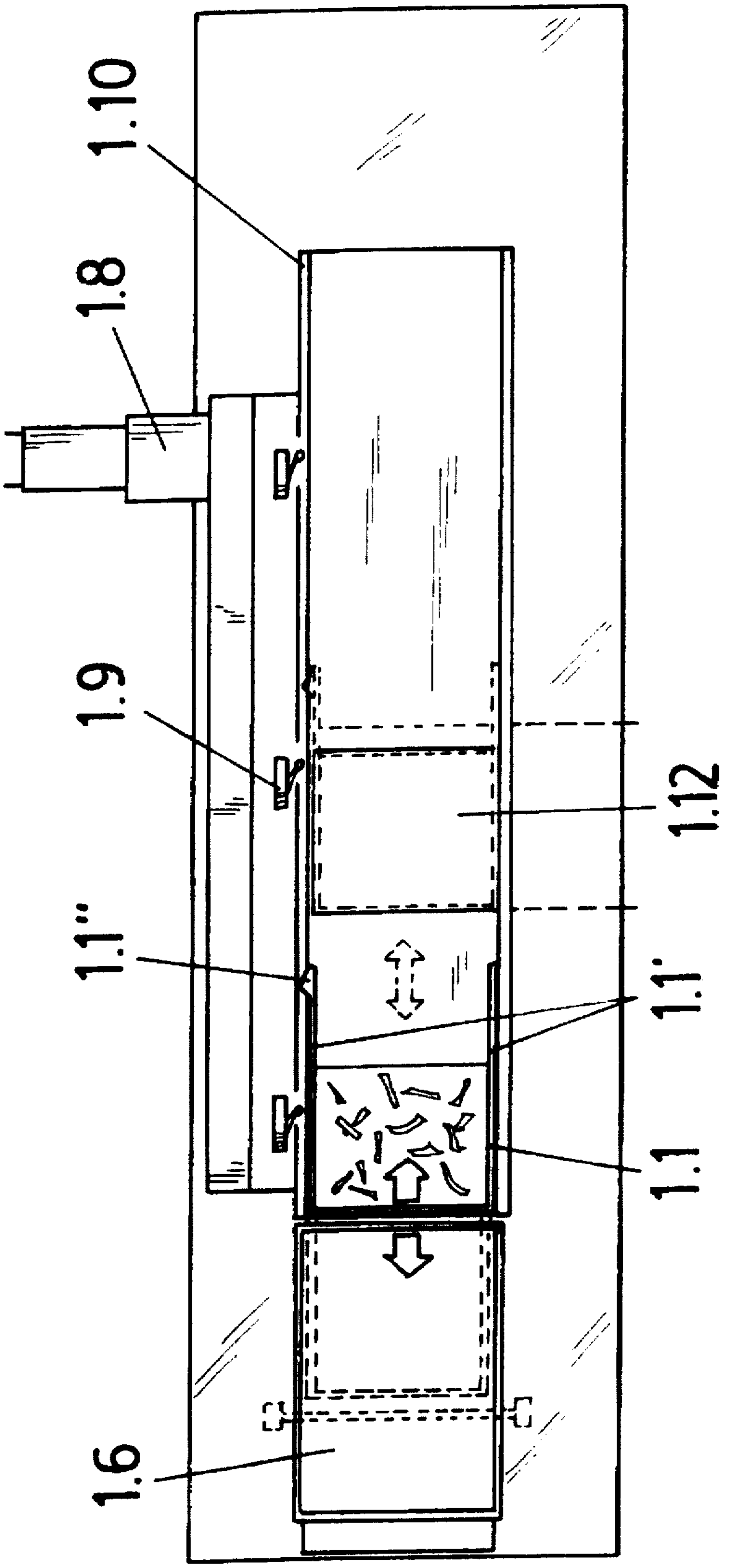
FIG. 3 is an upper plan view of the Roman scales located below the dispensing refrigerator represented in the prior figure.
Figure 4:
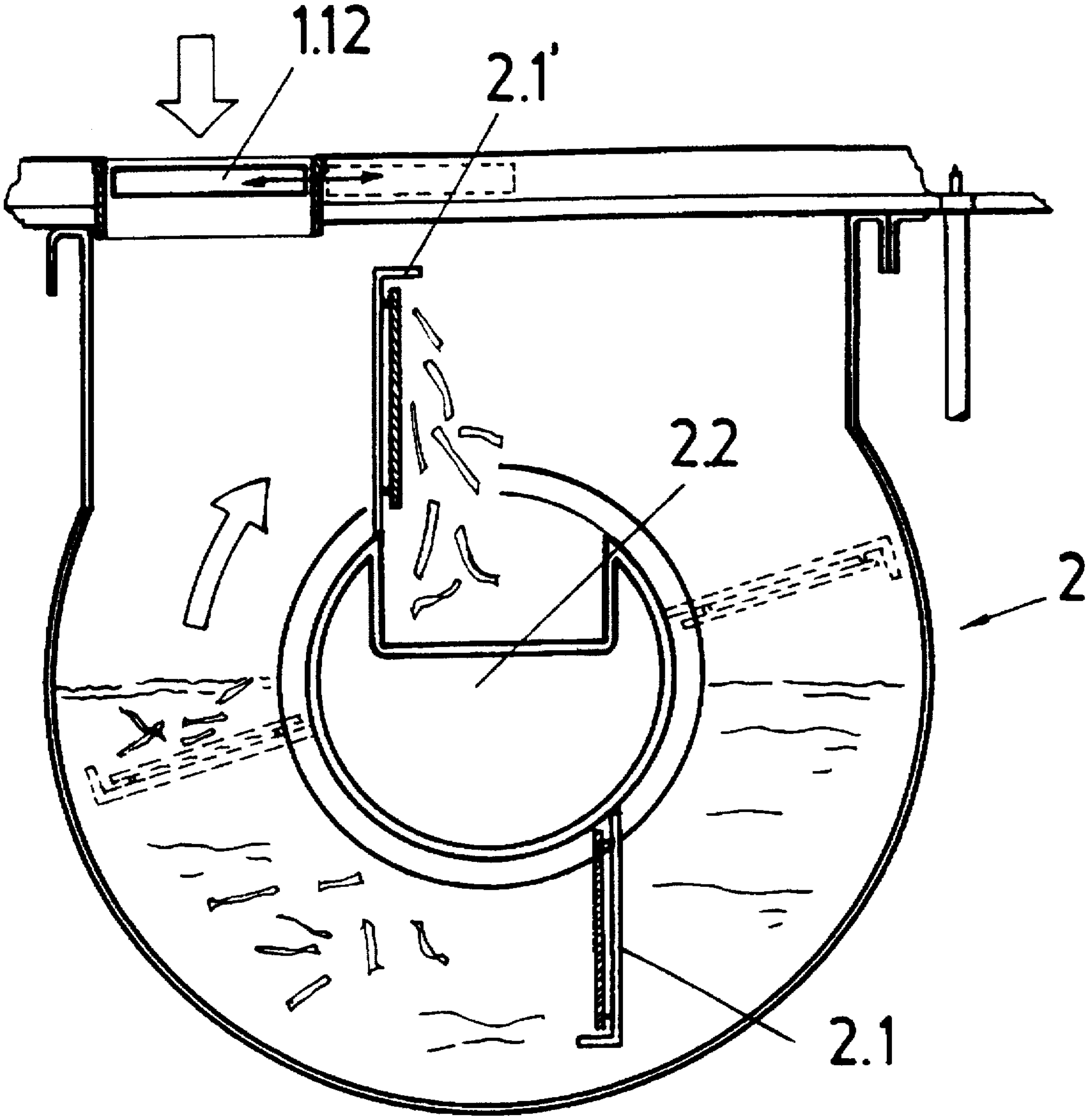
FIG. 4 represents a double arrangement of the French fries collection blades, enabling their sequential operation to be observed therein.
Figure 5:
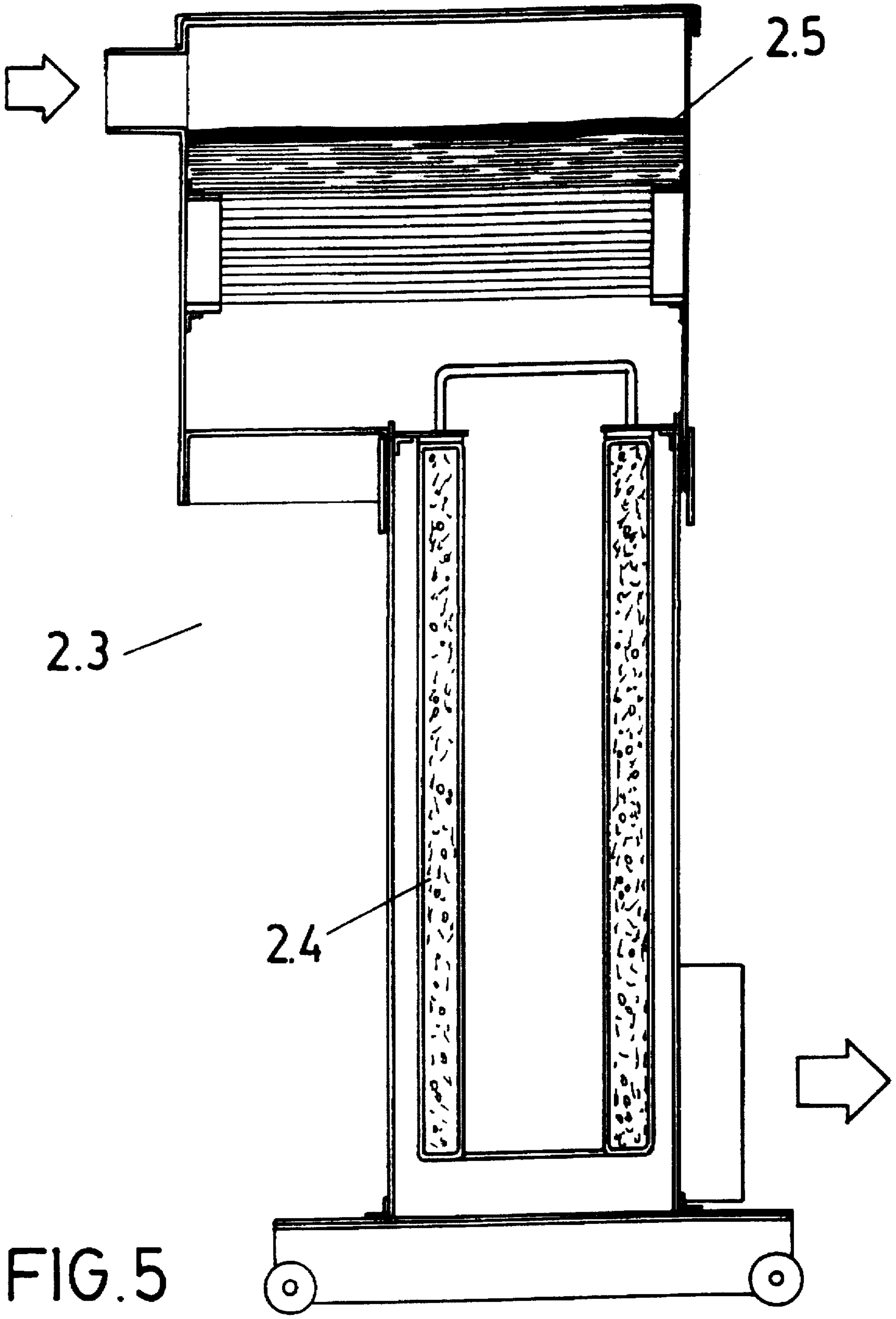
FIG. 5 represents a section and side elevation view of the double smoke filtering device, as per this invention.
Figure 6:
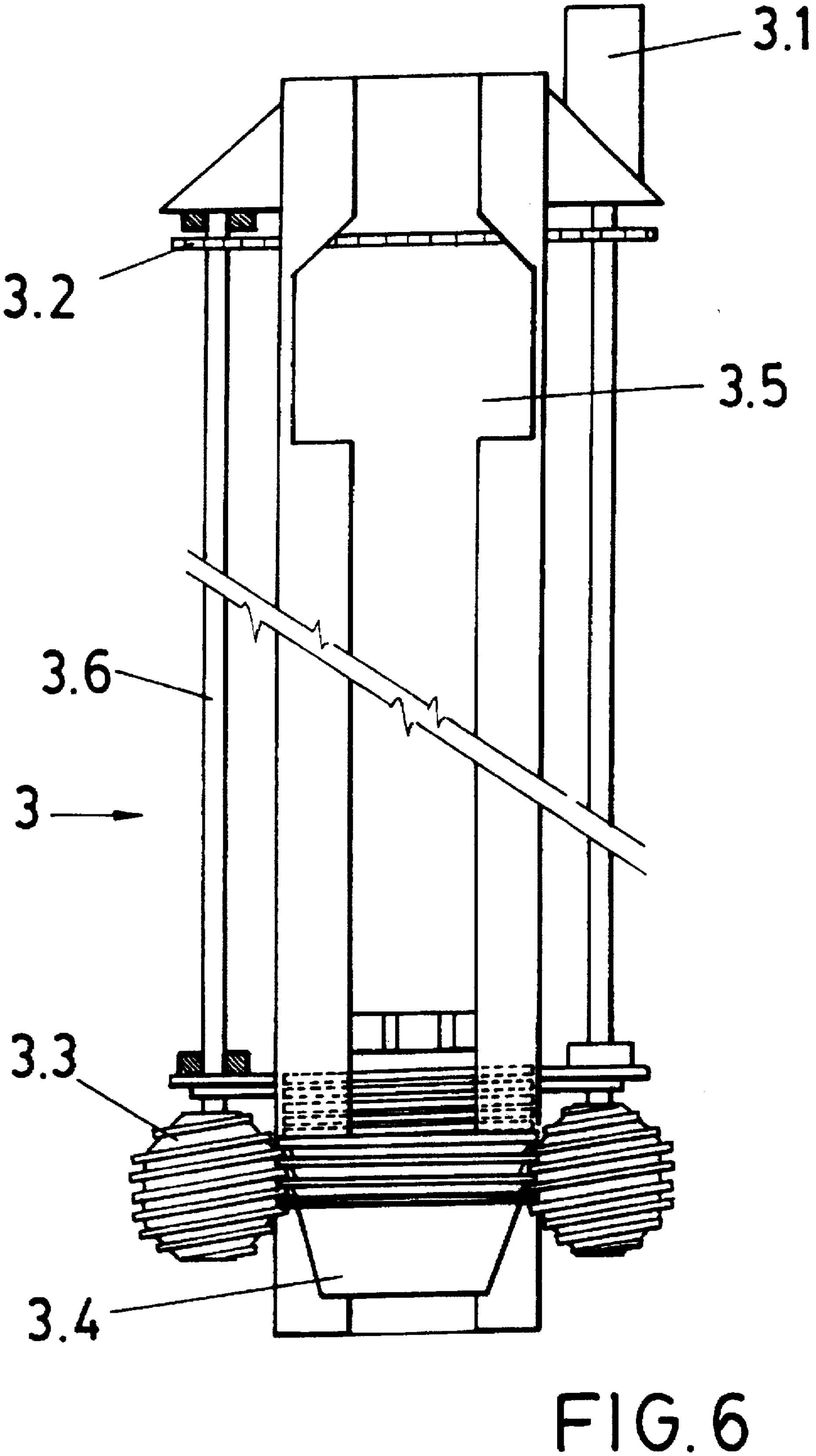
FIG. 6 is a frontal elevation view of the tray dosing mechanism.
Figure 7:
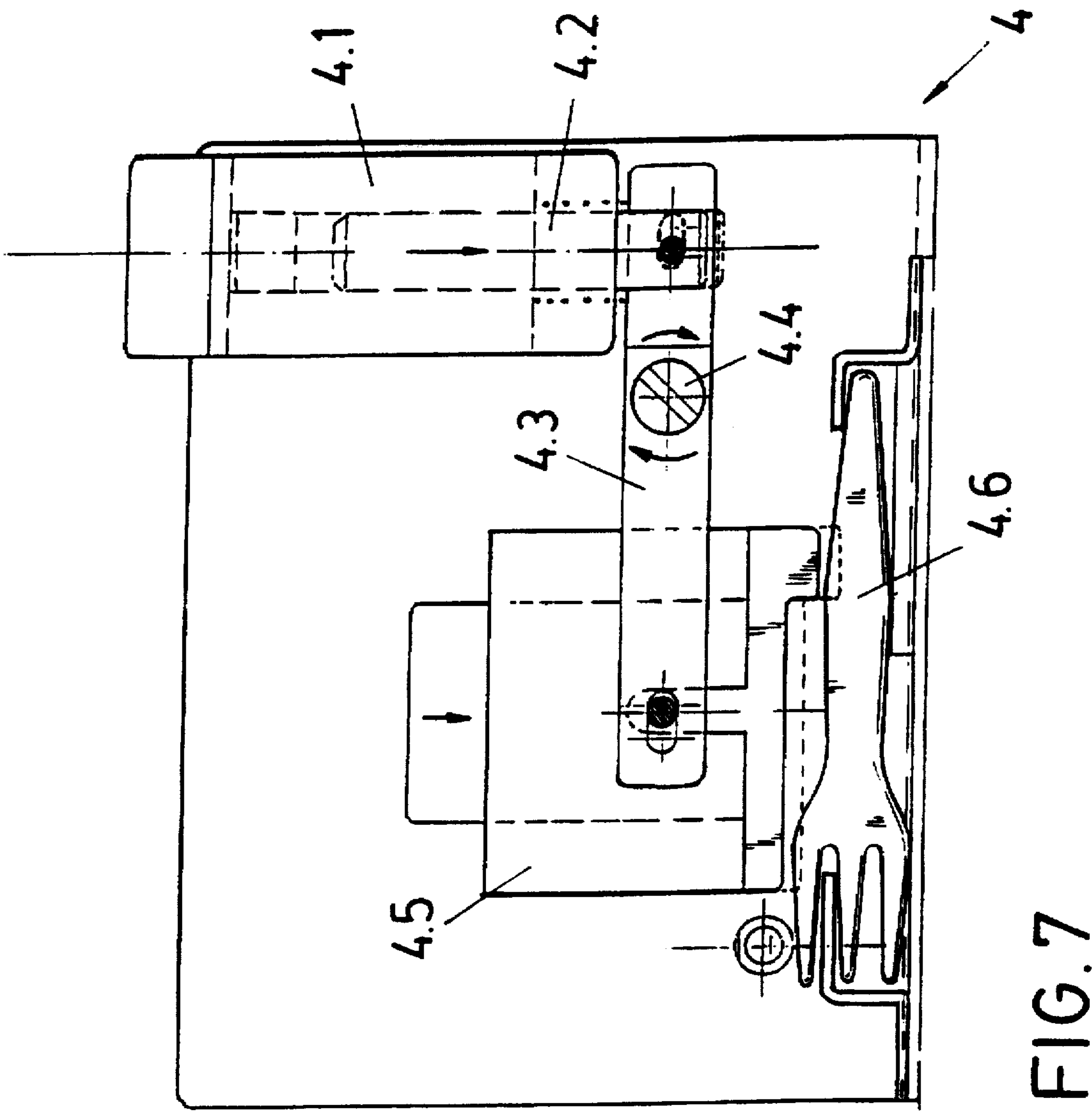
FIG. 7 is a plan view of the fork dispensing device, representing the way in which they are separated.
Figure 8:
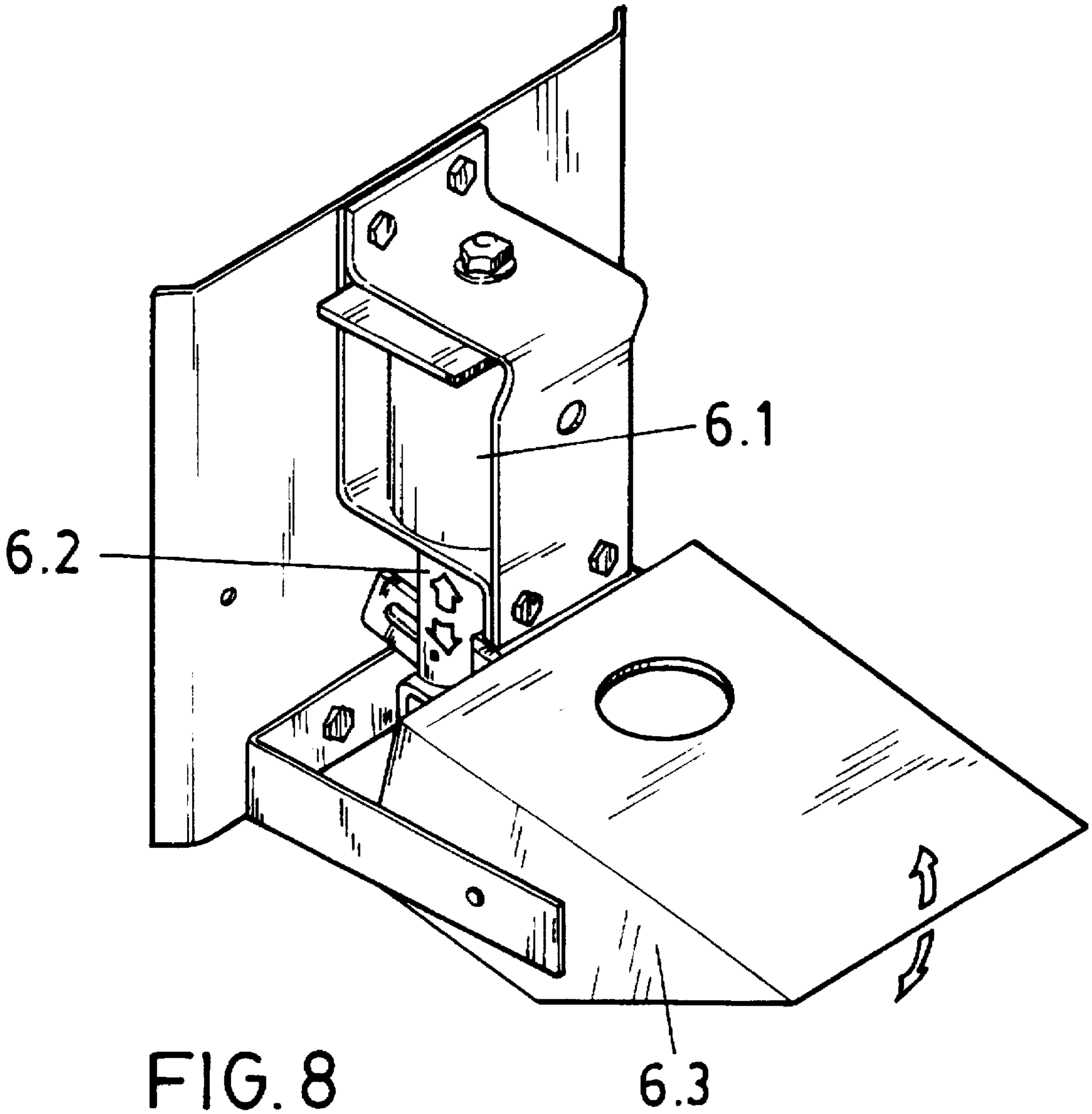
FIG. 8 represents the salt doser.
Figure 9:
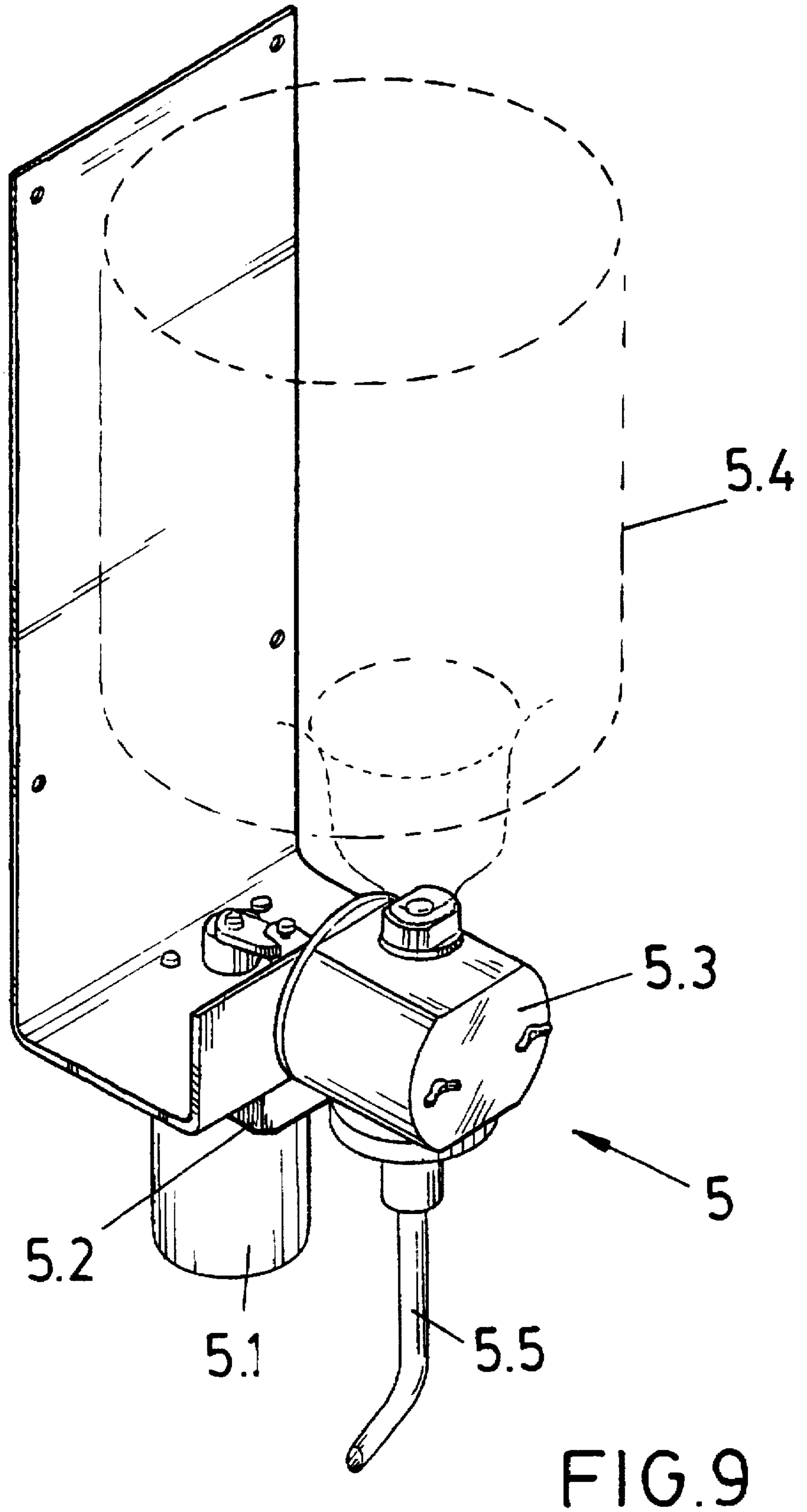
FIG. 9 represents one of the sauce dispensers.
Figure 10:
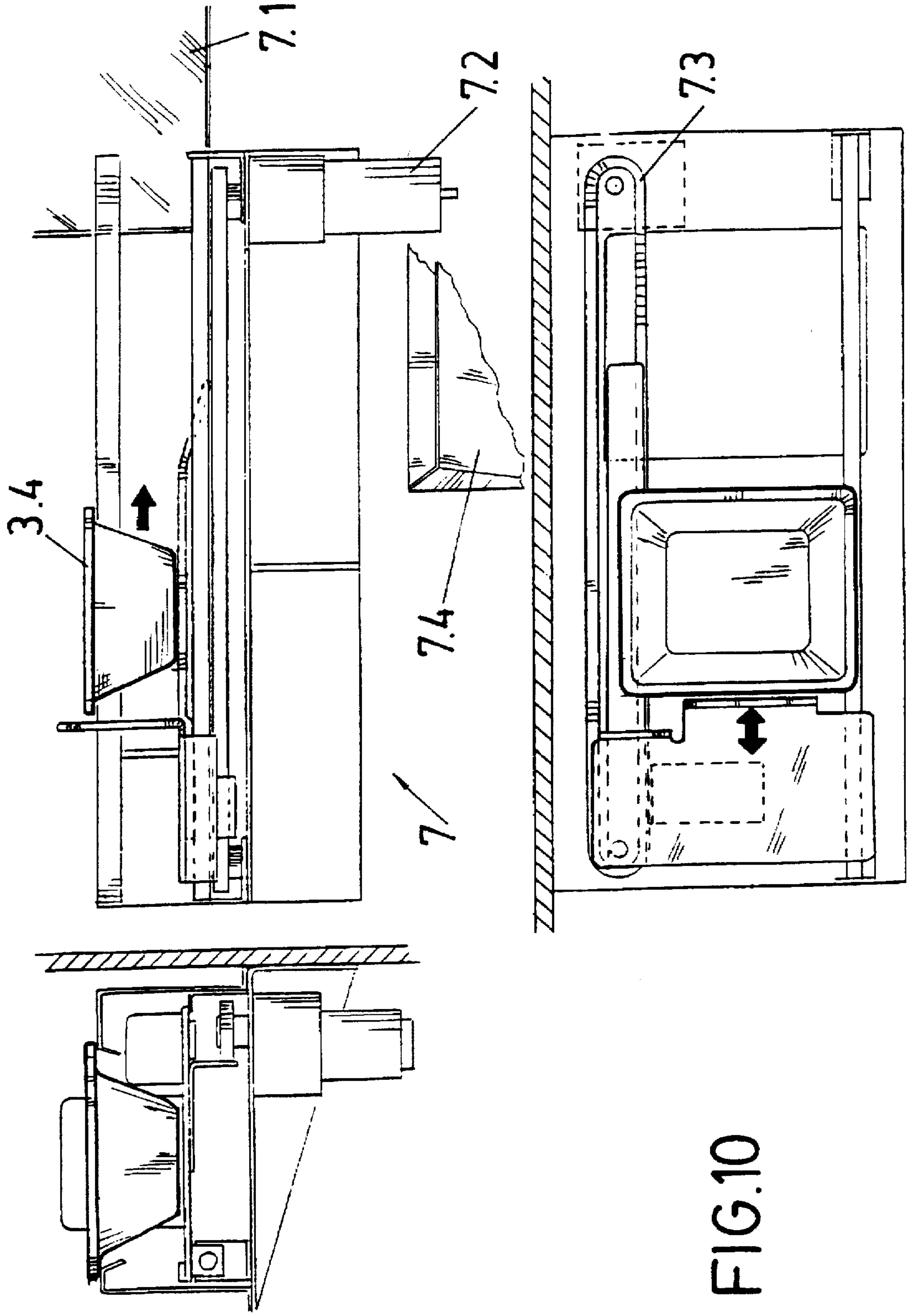
FIG. 10 represents a plan and schematic elevation view of the tray pulling trolley together with accessories.

Upon inspecting the above figures it may be observed how the invention herein advanced consists of an automatic French fries dispensing machine, of the type fitted with a cold store with potato chips dosing equipment (1), frier fitted with filter (2) and means to dispense containers (3), forks (4), sauces (5), salt (6) and further fitted with a tray pulling trolley (7), machine in which once the preferred type of fries and condiments has been duly selected using the push buttons (9), and after inserting the price required for one or several serves into the cash collection device (8), the frying process is carried out or the two consecutive frying processes are performed, after which an optical indicator (10), together with a sound indicator offering an appropriate message, are activated and the various products are duly dispensed, out of which the sauces and salt dosages are programmable at will, an external gate opens and the user—consumer, only has to remove the food tray and fork from the dispensing window (7.1) within the maximum allowed period of time, after which the tray carrying trolley (7) withdraws and deposits the tray into a downwardly arranged recipient (7.4) unless a photoelectric cell located at the product collection window (7.1) detects the earlier withdrawal of the tray and shorts out this cycle, allowing the access of the following tray with its corresponding ration.

This invention is characterized by the incorporation of a number of enhancements in respect of these components, such as the fact that the fridge fitted with a previously cut potato chips doser (1) incorporates a motor driven sliding container trolley (1.1), featuring three different positions, namely loading, waiting and unloading, arranged upon a set of dosing scales (1.2) fed from a hopper (1.3) fitted with a motor driven gearbox and worm screw (1.4) and lower heat insulating gate, that receives French fries from the storage tank (1.5) resting upon guides that make it easier to refill it, that once the hopper has been manually supplied with potato chips and the gate that also incorporates spring aided shutting means has been duly closed, the trolley takes them to the inlet of the frier (2), displacing its gate and dropping the potato chips inside it; being all of this assembly incorporated inside the cold store (1) and being accessible through its frontal door; which is the connection between the trolley (1.1) and the doser (1) cooling assembly and the frier (2); being the worm thread (1.4) located below the hopper (1.3) so as to regulate the passage of the product and make it fall upon the weighing plate (1.6) of the Roman scales (1.2) with serve size regulating counterweight (1.7), weighing plate upon which travels, through the action of the motor driven gearbox (1.8), the trolley (1.1), which is open at its upper and lower sides, and shaped as a transversally closed "U" and which has protruding wings (1.1') fitted with projections (1.1") that contact three microswitches (1.9) that actuate the motor driven gearbox (1.8) and cause the displacement of the trolley (1.1) containing the serve of French fries, guided by a "U" shaped profile with elbowed wings, from its loading position, near a top (1.11) and consecutively to the opposite unloading position, pushing open the frier (2) supply gate (1.12) and letting the fries drop through the opening practised into the "U" shaped guide (1.10) of the trolley (1.1) and finally passing on to an intermediate resting position, where it stays until a new service is to be performed.

The balancing of the weighing plate (1.7) is effected through the axis of a coil (1.13), the tilting arm (1.14) and a regulation screw (1.15) that adjusts its height in respect of the rest of the dosing platform by actuating upon the coil (1.13), that locks its axis (1.13) on the scales, thus preventing any alterations in the size of the potato portions.

Once the potato chips are received, the pointer (1.15) of the scales tilts, lifting a microswitch (1.16) that acts against the trolley (1.1) side displacement top (1.11), so that the counterweight (1.7) acts as a new lower regulation screw, centrally located in respect of the lower surface of the weighing plate, which then adopts a perfect balance and prevents the insertion of any potato bits between the weighing plate and the trolley displacement film; whereas the load microswitch (1.16) stops the operation of the worm thread (1.4), stopping the supply of potato chips into the container, closing the lower hopper gate and starting the forward displacement up to the opening of the frier (2) product supply sliding gate and the gravity drop of French fries within it.

There is a heat insulating film between the frier (2) and the dispenser cold store (1) as well as on the hopper gate and on the sliding frier access gate (1.12) both of which also form a metal sandwich.

The frier (2) is of the rotative type, with a single turn per serve, using two driven radial (2.1) and symmetrical (2.1') blades, a central hopper (2.2) forming an externally slanted slope and an actuation coil that controls the oil level; it is fitted with displacement guides to enable the oil used up to be replaced and topped up, both blades (2.1) emerge consecutively under the French fries, collect them and lift them up until they are gravity dropped, when the blade reaches the vertical position, into the central hopper (2.2) with an externally slanted slope, so that they drop into the tray (3.4), located in the dispensing recipient (7.1). Besides a metal filter, there is also a double filter (2.3), of the rectangular prismatic type, washable matt type (2.4) and a second consecutively arranged one, of the double parallel cylinder active coal type (2.5).

The tray dispenser (3) has an overhead motor (3.1) and pinion—chain traction (3.2) running down to two parallel shafts, with tray separation set by the thread pitch (3.3) of two cylindrical worm screws with tapered ends at which the previously described shafts (3.6) end; with trays (3.4) piled up through a centrally located supply window (3.5) and hanging consecutively from the thread.

The fork dispenser (4) keeps them vertically piled up and incorporates a coil (4.1) that excites a rod (4.2) that transmits the movement to a flat bar (4.3) that rotates around a holding point (4.4) and which is linked to a plate (4.5) that holds or releases the forks (4.6) with enough play at its end links to allow the plate (4.5) to swing.

Each sauce dispenser (5) has a motor (5.1), a piston rod—cranked handle mechanism (5.2) for the alternating movement of the piston (5.3) that creates a vacuum in an inverted overhead container (5.4) and causes the sauce to exit the lower outlet conduit (5.5) and to drop upon the tray (3.4), being further fitted with a conventional spring gate preventing unintended leaks or product backlash.

The salt dispenser (6) is made up of a motor (6.1), a piston rod—cranked handle mechanism (6.2) and a salt shaker (6.3) joined to the previously described mechanism that swings in the inverted position.

The tray (3.4) displacement trolley (7), arranged in consecutive positions of rest, French fries drop and collection by the customer at the delivery pit (7.1) fitted with an external gate, fitted with a motor and pinion—chain (7.3) transmission, as well as with a cam that actuates three microswitches and guiding means, consisting of a collar that slides upon a calibrated shaft.

When at rest position the trolley tilts by gravity if still occupied by the tray of French fries, dropping them automatically into a container located below (7.4), if the tray is not collected within a time period of 20 seconds, being it otherwise shorted out by a photoelectric cell that detects tray collection, so that the process may start all over again.

It must always be clearly understood that, as long as the essentiality of the invention is not altered, both the materials used, as well as the shape, size and arrangement of the elements herein described are open to variations within the same characteristic features.

The terms used during the description, as well as its sense must always be considered in a non limitative manner.

What is claimed is:

1. French fries dispensing machines, comprising a cold store (1.5), French fries dosing equipment (1), frier (2) fitted with two blades and a filter that fries previously cut potatoes fed from a hopper (1.3) using a worm screw (1.4); and means to dispense container (3), forks (4), sauces (5), salt (6); and further fitted with a tray pulling trolley (7); wherein said machine, once the preferred type of fries and condiments has been duly selected using push buttons (9), and after inserting the required price for one or several serves into the cash collection slot (8), the frying process is performed, after which an optical indicator (1), together with a sound indicator offering an appropriate message, are activated and the various products are duly dispensed, an external gate is lifted and the user, only has to remove the food tray and fork from the dispensing window (7.1), characterized by its cold store fitted with a potato chip dispensing device (1) using Roman scales, being the frier fitted with two blades and a double filter (2) utilizing a matt and active coal, and by this automatic machine being further fitted with dispensing means (3) that prevent the trays (3.4) from dropping in a tilted position and which also dispenses forks (4), as well as sauce (5) and salt (6) dosers that may be programmed at will; whereas an external product access window is lifted and the user only has to remove the food tray and fork from the dispensing window (7.1).

2. French fries dispensing machine, as per claim 1, characterized in that the doser (1) incorporates a motor driven sliding container trolley (1.1) featuring three different positions, namely loading, waiting and unloading, arranged upon a set of dosing scales (1.2) fed from a hopper (1.3) fitted with a motor driven gearbox and worm screw (1.4) and lower heat insulating gate, that receives the French fries from the storage tank (1.5); the trolley (1.1) takes them to the frier (2), going through two heat insulating gates fitted to the hopper and frier; being all of this assembly incorporated inside the cold store (1) and being accessible through its frontal door; it does also incorporate spring loaded closing means that constitute the connection between the trolley (1.1) and the doser (1) cooling assembly and the frier (2); being the worm thread (1.4) located below the hopper (1.3) so as to regulate the passage of the product and make it fall on the weighing plate (1.6) of the Roman scales (1.2) fitted with manual portion size regulating counterweight (1.7); weighing plate upon which travels, through the action of the motor driven gearbox (1.8), the trolley (1.1), which is open at its upper and lower sides, is shaped as a transversely closed "U" and which has protruding wings (1.1') fitted with projections (1.1") that contact three microswitches (1.9) that actuate the motor driven gearbox (1.8) and cause the displacement of the trolley (1.1) containing the potato chip portion, guided by a "U" shaped profile with elbowed wings, from its loading position, near a top (1.11) and consecutively to the opposite unloading position, pushing open the frier (2) supply gate (1.12) and letting the fries drop through an opening formed into the "U" shaped guide (1.10) of the trolley (1.1) and finally passing on to an intermediate resting position, where it stays until a new service is to be performed.

3. French fries dispensing machine, as per claim 2, characterized in that the balancing of the weighing plate (1.7) is affected by the rod of a coil (1.13), a tilting arm (1.14) and an adjusting screw (1.15) that adjusts its height in respect of the rest of the dosing platform by actuating upon the coil (1.13), that locks its rod (1.13) upon the scales, thus preventing any alterations in respect of the size of the potato portions.

4. French fries dispensing machine, as per claim 2, characterized in that the pointer of the scales tilts, once the potato chips are received, lifting a microswitch (1.16) that acts against the trolley (1.1) side displacement top (1.11), so that the counterweight (1.7) acts as a lower regulation screw, centrally located in respect of the lower surface of the weighing plate (1.6), which then adopts a perfect balance and prevents the insertion of any potato chips between the weighing plate and the trolley displacement belt; whereas the load microswitch (1.16) stops the operation of the worm screw (1.4), stopping the supply of potato chips into the hopper (1.3), closing the lower hopper gate and starting the forward movement up to the opening of the frier (2) product supply sliding gate and the gravity drop of French fries within it.

5. French fries dispensing machine, as per claim 4, characterized in that there is a heat insulating film, between the frier (2) and the dispenser cold store (1), as well as on the hopper gate and on the sliding frier access gate (1.12), both of which also form a metal sandwich.

6. French fries dispensing machine, as per claim 1, of which the frier (2) is rotative and of a single rotation per serve, with two driven radial and symmetrical (2.1, 2.1') blades, a central hopper (2.2) forming an externally slanted slope, characterized in that the potato chips are dropped from the hopper (2.2) into the tray (3.4) located on the trolley (7); and the filter unit (2.3), besides a metal filter, is fitted with another one of the washable matt type (2.4) and a second, consecutively arranged one, of the double parallel cylinder active coal type (2.5) and further by its being fitted with an actuating coil that controls the oil level; it is further fitted with displacement guides which purpose is to enable the replacement and top up of the oil used up.

7. French fries dispensing machine, as per claim 1, characterized in that the tray dispenser (3) is fitted with an overhead motor (3.1) and pinion—chain traction (3.2) running down to two parallel shafts, with tray separation set by the thread pitch (3.3) of two cylindrical worm screws with tapered ends at which the previously described shafts (3.6) end; with the trays (3.4) piled up through a centrally located supply window (3.5) and hanging consecutively from the thread (3.3).

8. French fries dispensing machine as per claim 1, characterized in that the fork dispenser (4) also keeps the forks vertically piled up and incorporates a coil (4.1) that excites a rod (4.2) that transmits the movement to a flat bar (4.3) that rotates around a holding point (4.4) and which is linked to a plate 4.5) that holds or releases the forks (4.6) with enough play at its end links as to allow the plate (4.5) to swing.

9. French fries dispensing machine, as per claim 1, characterized in that each sauce dispenser (5) has a motor (5.1), a piston rod—cranked handle mechanism (5.2) for the alternating movement of the piston (5.3) that creates a vacuum in an inverted overhead container (5.4) and causes the sauce to exit the lower outlet conduit (5.5) and to drop upon the tray (3.4), being further fitted with a conventional spring gate that prevents unintended leaks or product backlash.

10. French fries dispensing machine, as per claim 1, characterized in that the salt dispenser (6) is made up of a motor (6.1), a piston rod—cranked handle mechanism (6.2) and a salt shaker (6.3) joined to the previously described mechanism that swings in the inverted position.

11. French fries dispensing machine, as per claim 1, characterized in that the tray (3.4) advancement trolley (7), arranged in consecutive positions of rest, French fries drop and collection by the customer at the delivery pit (7.1) fitted with an external gate, fitted with a motor and pinion—chain (7.3) transmission, as well as a cam that actuates upon three microswitches and guiding means, consisting of a collar that slides upon a calibrated shaft, trolley (7) which, when at its rest position, tilts by gravity if still occupied by the tray of French fries, dropping them automatically into a container located below (7.4), if the tray is not collected within a previously set maximum time period, being otherwise shorted out by a photoelectric cell that detects tray collection, thus allowing the following tray (3.4) to proceed.

12. In an automated French fries dispensing machine having a cold store for the unfried potato chips, potato chip dosing equipment, a frier and means for delivering a dose of the fried chips to a customer, the improvement comprising: said dosing equipment being housed within said cold store.

13. The machine according to claim 12, in which said dosing equipment includes: Roman scales having a portion size regulating counterweight and a weighing plate; means for feeding potato chips from said cold store to weigh upon said weighing plate; and means for terminating said feeding by said feeding means when said Roman scales are balanced.

14. The machine according to claim 13, in which said means for delivering a dose of the fried chips to a customer includes a tray, the improvement comprising: tray dispensing means, for holding a stack of said trays and dispensing one at a time to receive a dose from said frier; said tray dispensing means including a pair of commonly driven, threaded members which are spaced apart so as to hold therebetween and within their opposed threads at least one of said trays horizontally and, upon rotation of said threaded members a specific amount, one of said trays is released vertically, proximate to an output hopper of said frier.

15. The machine according to claim 12, in which said frier includes means for separately holding two doses of the potato chips, for frying those two doses in one cycle of said frier; and said for delivery machine includes controls for delivering to said frier, from said dosing equipment, two time-separated doses of the potato chips, during one cycle of said frier.

* * * * *